United States Patent [19]

Aly

[11] Patent Number: 4,665,531
[45] Date of Patent: May 12, 1987

[54] ALTERNATE MARK INVERSION (AMI) RECEIVER

[75] Inventor: Sami A. Aly, Kanata, Canada

[73] Assignee: Northern Telecom Limited, Montreal, Canada

[21] Appl. No.: 816,788

[22] Filed: Jan. 7, 1986

[30] Foreign Application Priority Data

Oct. 1, 1985 [CA] Canada ................................ 491965

[51] Int. Cl.[4] ............................................ H04L 25/49
[52] U.S. Cl. ........................................ 375/17; 375/94; 360/40
[58] Field of Search .................. 375/17, 19, 20, 94; 340/347 AD; 360/40, 42, 43, 44, 48; 455/608

[56] References Cited

U.S. PATENT DOCUMENTS

| 2,700,696 | 1/1955 | Barker | 375/19 |
| 3,828,346 | 8/1974 | Forster et al. | 375/19 |
| 4,112,383 | 9/1978 | Burgert | 375/120 |
| 4,267,595 | 5/1981 | Hernandez | 375/95 |
| 4,507,621 | 3/1985 | Meyer | 375/17 |
| 4,584,690 | 4/1986 | Cafiero et al. | 375/60 |

Primary Examiner—Robert L. Griffin
Assistant Examiner—Stephen Chin
Attorney, Agent, or Firm—J. E. Moorhouse

[57] ABSTRACT

An AMI signals receiver generates a logic signal stream representative of AMI encoded information signals which have traversed a transmission medium. Adaptive compensation circuits are responsive to characteristics of the received AMI signals for generating a bipolar signal ideally corresponding to the transmitted AMI signal but in practice includes noise primarily caused by near-end crosstalk. An apparent improvement in the signal-to-noise ratio is achieved by generating a unipolar signal from instant and last amplitude samples of the bipolar signal and thereafter differentially decoding a binary signal representation of the unipolar signal.

4 Claims, 5 Drawing Figures

ALTERNATE MARK INVERSION (AMI) RECEIVER

FIELD OF THE INVENTION

The invention is in the field of bipolar signal transmission and reception. Such signals are typically referred to as alternate mark inversion (AMI) signals. These signals may also be referred to as bipolar return-to-zero (BPRZ) signals. More specifically, the invention is directed to a function of recovering information from an AMI signal stream.

BACKGROUND OF THE INVENTION

The advent of practical digital telephony was first manifest in trunking of digitally encoded voiceband signals between analog signal switching offices. Subsequently the telephone network has been and continues to evolve toward a primarily digital signals network with new and replacement switching offices being of the digital type. Recently the concept of an integrated services digital network (ISDN) has been widely discussed and published. Practical implementation of ISDN requires a wide band communication path between a subscriber's station set or terminal and the associated switching office. Various means for providing the required wide band transmission path may include the use of optical fiber or coaxial cable. However the fact remains that a near future scrapping of the in place copper twisted pair local distribution telephony network and replacing it with an alternative will be so expensive as to be cost prohibitive. It is self-evident that provision of wide band subscriber lines by such replacement must therefore proceed if at all at a slow and fundable pace. A practical alternative is that of expanding the operational band width of the already in place twisted pair copper conductor subscriber line. Sophisticated termination apparatus applied at the ends of a subscriber line and utilization of the AMI signal format is capable of providing for bit rates in excess of 100 Khz in full duplex four-wire and two-wire configurations. Various publications are directed toward illustrating the required terminal appratus, one such publication being U.S. Pat. No. 4,528,676 entitled "Automatic Correction Circuit for Received Digitally Encoded Signals" issued to Gordon Mein et al on 9 July, 1985.

Telephone subscriber lines for the most part are provided by insulated copper wires being twisted into pairs, each pair being part of a multipair conductor. Sometimes in excess of 100 such pairs are bound together in a cable. Interconductor, inductive and capacitive coupling characteristics are avoided to an extent practical, however crosstalk between the pairs, not normally a problem at analog voice frequencies, is one deleterious limitation on the wide band operation of the subscriber line. However the effect of crosstalk, particuarly near-end crosstalk, at the AMI receiver is random and not directly compensatable by methods and apparatus such as automatic line build-out circuits, adaptive equalizers or echo cancellers.

SUMMARY OF THE INVENTION

The invention is concerned with generation of a logic signal stream being representative of AMI encoded information signals having traversed a transmission medium between an originating means of the AMI encoded information signals and an AMI signals receiver. In accordance with the invention, an equalizer is responsive to signals traversing the transmission medium to generate received AMI signals having characteristics similar to characteristics of the AMI encoded information signals as they were transmitted. An improved immunity to near-end crosstalk is provided by a signal processor which generates unipolar signals in response to negative and positive signal excursions in the received AMI signals. In the signal processor an excursion of one polarity produces a unipolar signal of an amplitude approaching a maximum amplitude. A subsequent excursion which by definition must be of the other polarity, reduces the amplitude of the unipolar signal toward zero. A detector generates a binary signal in accordance with greater and lesser unipolar amplitudes from the signal processor, with reference to a predetermined potential. A decoder generates the logic signal stream in response to the binary signal from the detector.

The operation of the signal processor has been characterized as a frequency domain related function which may be expressed as $1/(1-Z^{-1})$, where the expression $Z^{-1}$ represents a delay of one baud period. It has also been characterized as a time domain related function which may be expressed as $y(t)=y(t-T)+x(t)$ where $y(t)$ is the instant unipolar output amplitude, $x(t)$ is the instant bipolar input amplitude and $y(t-T)$ is the last occurring previous instant unipolar output amplitude, T being one baud period.

BRIEF DESCRIPTION OF THE DRAWINGS

Examples of AMI signal receivers are discussed with reference to the accompanying drawings in which.

DETAILED DESCRIPTION

Figure 1:
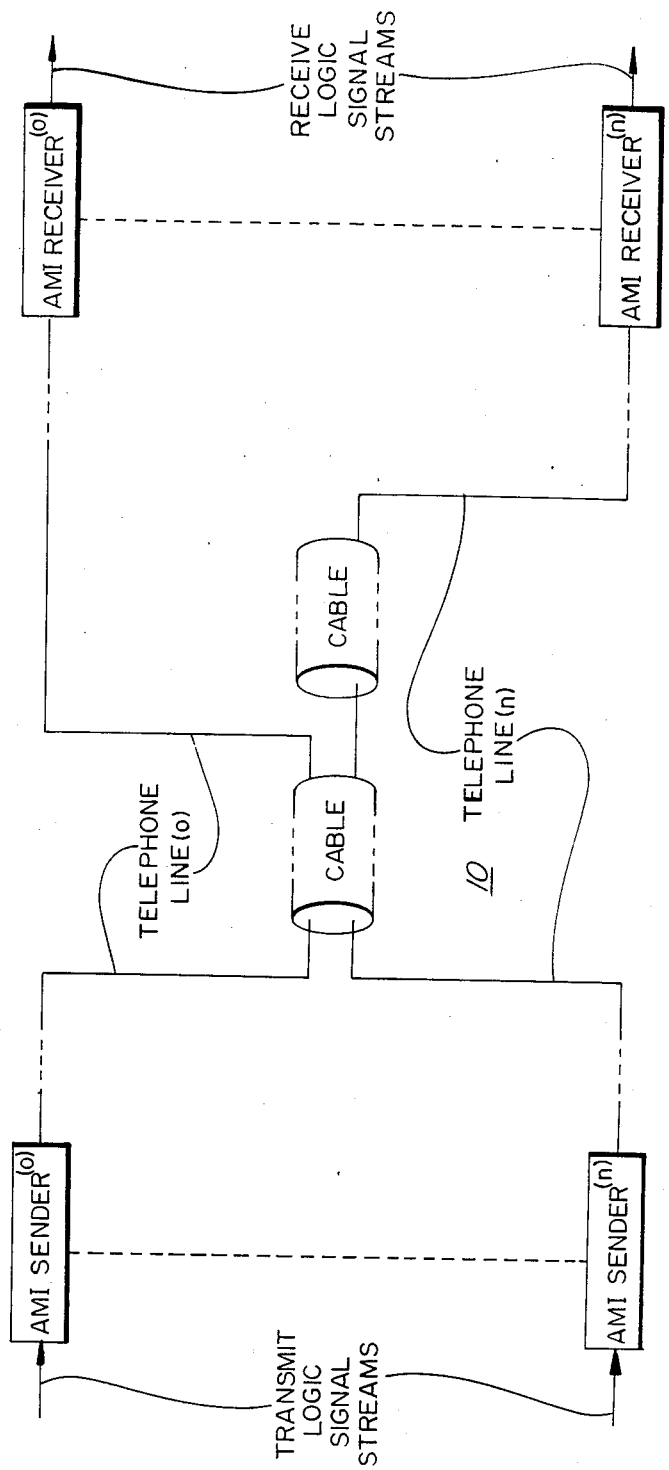
FIG. 1 is a diagramatic illustration of a plurality of local distribution telephone network lines terminated with AMI senders and receivers.
Figure 3:
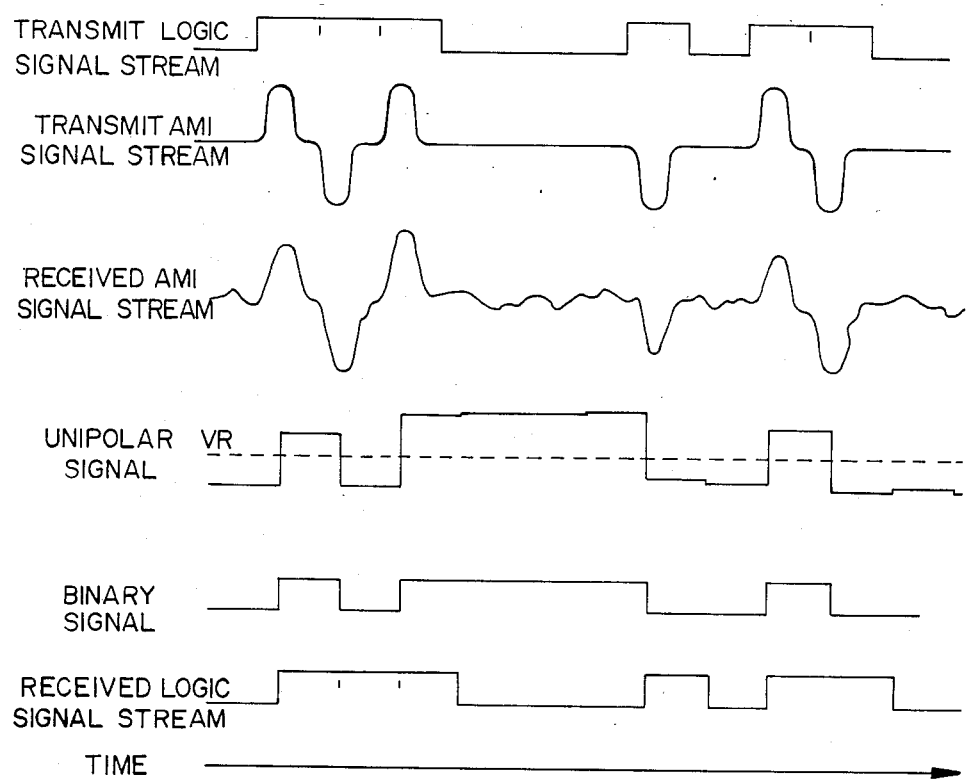
FIG. 3 is a graphical illustration of various waveforms exemplary of AMI signal transmission reception and decoding in accordance with the invention.

One environment wherein ISDN is thought to find practical and widespread use in the near future is illustrated in FIG. 1. FIG. 1 shows a plurality of AMI senders (0)–(n) coupled to drive AMI signal streams as idealized in FIG. 3 via respective telephone lines (0)–(n), the telephone lines, shown at 10 in FIG. 1, having been installed to provide a local telephone network at various times in the past. The telephone lines are of various lengths and may be historically undocumented as to the presence of bridge taps and splices. Consequent signal degradation and practical remedies for same are of record in various publications. Near-end crosstalk, results from AMI transmitters (not shown) operating near an AMI receiver. An associated AMI transmitter is usually connected via a hybrid circuit (not shown) at the input of the receiver. In any case the near-end crosstalk has the deleterious effect of reducing the signal to noise ratio in a received AMI signal stream as illustrated in FIG. 3. The minor variations in the received AMI signal stream, that is after it has been processed by adaptive equalization are attributed to crosstalk, primarily near end crosstalk. Typically in an AMI signal receiver, the received AMI signal stream is detected directly by periodically comparing the signal stream with negative and positive reference voltages or thresholds. Those periodically defined portions of the AMI signal stream which exceed either threshold are detected to be representative of binary one bits and those which do not are taken to be binary zero bits.

Figure 2:
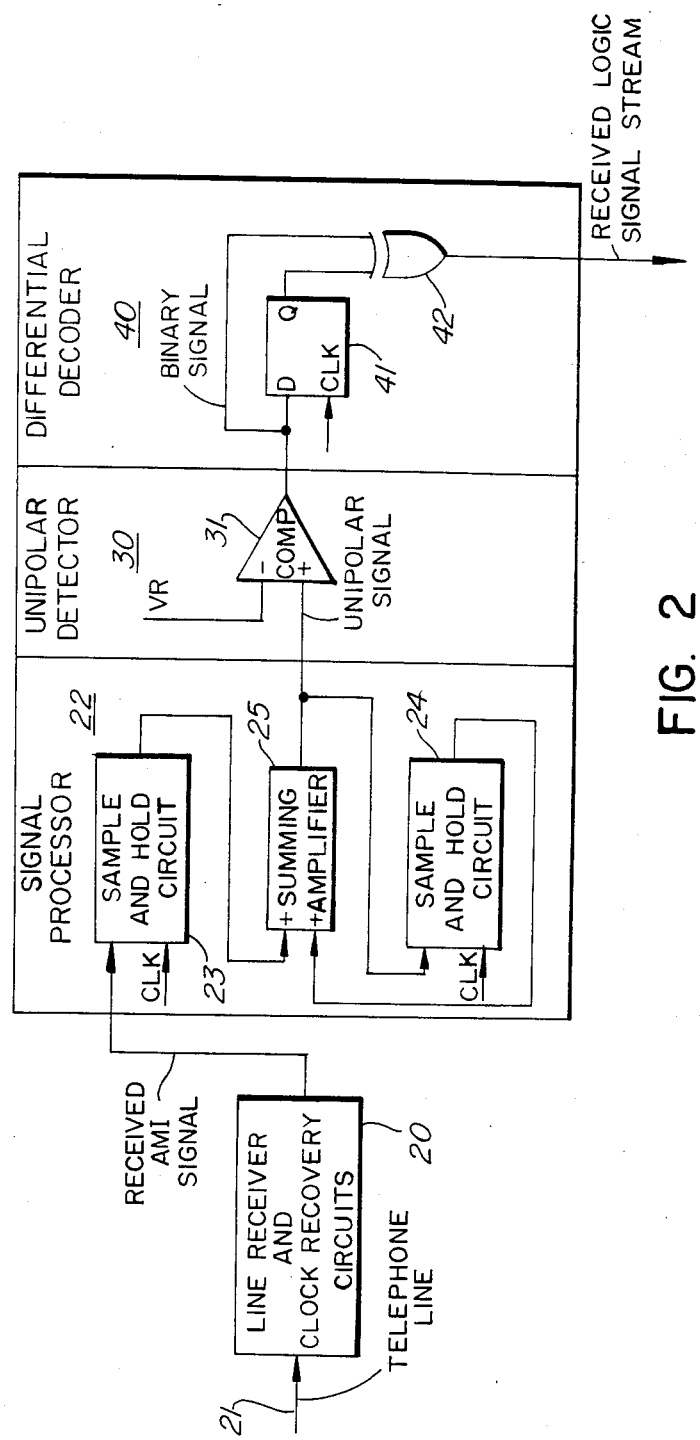
FIG. 2 is a block schematic diagram of an example embodiment of an AMI receiver in accordance with the invention.

The AMI signal receiver illustrated in FIG. 2 is exemplary of a new AMI signal detector structure which has the operational effect of improving the AMI received signal to noise ratio by an amount of between four to six decibels in the presence of near-end crosstalk. In FIG. 2 a transmission medium in the form of a telephone line 21 is connected directly or via a hybrid circuit (not shown) to line receiver and clock recovery circuits at 20 in accordance with practice well known to persons of skill in digital telephony. The far end of the telephone line 21 is driven with a transmit AMI signal stream which is encoded for the purpose of illustration in FIG. 3 in accordance with a transmit logic signal stream. The received AMI signal stream is illustrated in FIG. 3 without the delay inherent in the traversal of any transmission medium as a matter of convenience. A first sample-and-hold circuit 23, a second sample-and-hold circuit 24 and a summing amplifier 25 are connected as shown to provide a signal processor 22. The received AMI signal stream is applied to an input of the first sample-and-hold circuit 23. The first sample and hold circuit 23 is activated periodically by a clock signal synchronized with the baud rate of the received AMI signal stream to apply an instant sampled amplitude of the received AMI signal stream to an input of the summing amplifier 25. Assuming the other input of the summing amplifier 25 to be near zero, the output of the amplifier 25 assumes the potential of the output of the first sample-and-hold circuit 23. In the next clock tick the second sample-and-hold circuit 24 passes the output potential of the summing amplifier 25 to its other input. In the case where the previous clock tick coincided with a positive polarity excursion in the received AMI signal, the next occurring excursion in the AMI signal must by definition be of negative polarity. In this case, the output of the summing amplifier will only return significantly toward zero in response to a negative polarity excursion in the received AMI signal. The output of the signal processor 22 is provided by the summing amplifier 25. This output is connected to a non-inverting input of a comparator 31 in a unipolar detector 30. An inverting input of the comparator 31 is connected to a predetermined potential (VR), a d.c. voltage provided in the unipolar detector. The comparator 31 responds to the potentials at its respective inputs to produce a binary signal as exemplified in FIG. 3. A differential decoder 40 includes a D type flip-flop 41 and an exclusive OR gate 42 connected as shown. The differential decoder operates in response to the clock signal and the binary signal to generate a received logic signal stream as exemplified in FIG. 3.

The operation of the signal processor 22 has been characterized as a frequency domain related function which may be expressed as $1/(1-Z^{-1})$, where the expression $Z^{-1}$ represents a delay of one baud period. It has also been characterized as a time domain related function which may be expressed as $y(t)=y(t-T)+x(t)$ where $y(t)$ is the instant unipolar output amplitude, $x(t)$ is the instant bipolar input amplitude and $y(t-T)$ is the last occurring previous instant unipolar output amplitude, T being one baud period.

Figure 4:
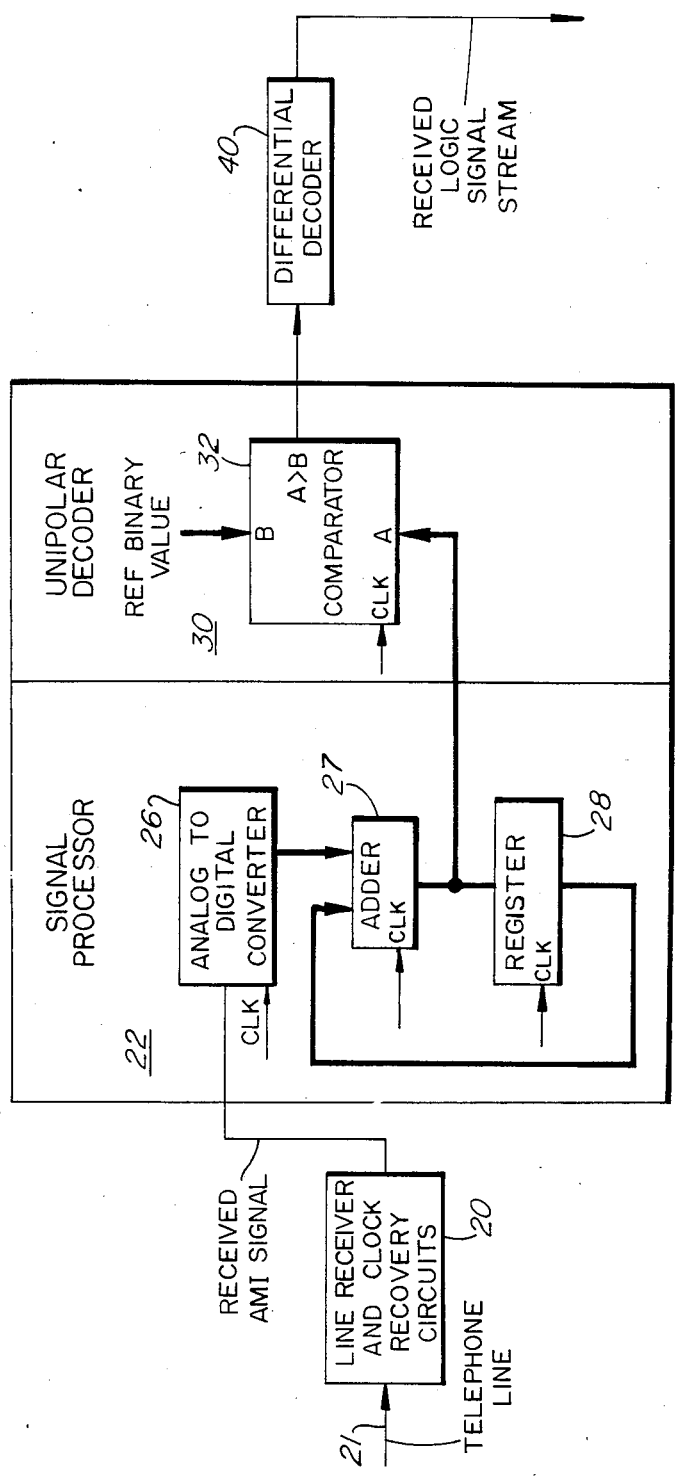
FIG. 4 is a block schematic diagram of another embodiment of an AMI receiver in accordance with the invention.
Figure 5:
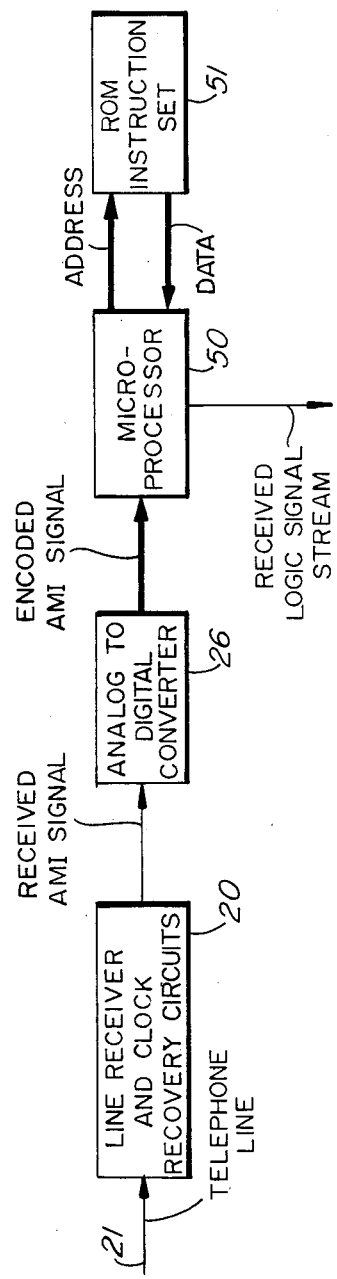
FIG. 5 is a block schematic diagram of yet another embodiment of an AMI receiver in accordance with the invention.

If significant volumes of manufacture are required, alternate embodiments of the invention as illustrated in FIGS. 4 and 5 may be more commercially attractive than the example illustrated in FIG. 2. In FIG. 4 the signal processor is provided by an analog-to-digital converter 26 which generates a digital word representation, including sign, of each baud sample of the received AMI signals. An adder 27 and a register 28 algebraically add the instant baud sample with the last baud sample. The output of the adder 27 is connected to a comparator 32 which compares the result of each addition with a predetermined reference binary value to generate a binary signal at an A greater than B output. The differential decoder 40 as illustrated in FIG. 2 is suitable in FIG. 4 for generating the received logic signal stream.

The embodiment of FIG. 5 is similar to that illustrated in FIGS. 2 and 4 in as much as circuit blocks 20 and 26 are required. However in this example the remaining functions of summing, detecting and decoding are performed by a microprocessor 50 which priodically receives the word encoded AMI signals from the analog to digital converter 26 and provides the received logic signal stream in accordance with an instruction set being stored in and readable from a ROM 51.

It is envisaged that the microprocessor 50 and its associated ROM 51 will eventually in one case be part of a subscriber's terminal apparatus wherein it will also be capable of implementing various other functions required in the terminal apparatus; and in another case be part of the subscriber's associated ISDN line circuit in a central switching office or private branch exchange.

What is claimed is:

1. An alternate mark inversion (AMI) signals receiver, for generating a logic signal stream representation of AMI encoded information signals, the AMI signals having traversed a transmission medium between an originating means of the AMI encoded informations signals and the AMI signals receiver, comprising:

equalization means, being responsive to characteristics of the AMI encoded information signals having traversed the transmission medium, for generating therefrom received AMI signals having characteristics similar to characteristics of the AMI encoded information signals as transmitted at the originating means;

signal processor means for generating a unipolar signal in response to positive and negative polarity signal excursions in the received AMI signals, such that an excursion of one of said polarities produces a signal having a unipolar amplitude approaching a maximum amplitude and a subsequent excursion of the other of said polarities reduces the unipolar amplitude toward zero;

detection means for generating a binary signal in accordance with greater and lesser unipolar amplitudes from the signal processor means, with reference to a predetermined potential; and decoding means being responsive to the binary signal from the detection means for generating said logic signal stream.

2. An AMI signals receiver as defined in claim 1 including a clock means for generating a timing signal being synchronized with the received AMI signals and wherein the signal processor means comprises:
  a summing amplifier having two inputs and an output for generating the unipolar signal;
  a first sampling circuit being responsive to the timing signal for applying amplitude samples of the received AMI signals to one of the inputs of the summing amplifier at the baud rate of the AMI signals;
  a second sampling circuit being responsive to the timing signal for applying samples of the unipolar signal from the output of the summing amplifier to the other of the inputs of the summing amplifier at said baud rate.

3. An AMI signals receiver as defined in claim 1 including a clock means for generating a timing signal being synchronized with the received AMI signals, and wherein the decoder comprises:
  a differential decoder comprising a flip-flop being responsive to the timing signal for storing the state of the binary signal from the detection means, and an exclusive OR gate being responsive to instant states of the binary signal and last stored states of the binary signal for generating said binary signal stream.

4. An AMI signals receiver as defined in claim 2 wherein the decoder is a differential decoder comprising:
  a flip-flop being responsive to the timing signal for storing the state of the binary signal from the detection means, and an exclusive OR gate being responsive to instant states of the binary signal and last stored states of the binary signal for generating said binary signal stream.

* * * * *